United States Patent [19]
VanBrocklin

[11] Patent Number: 6,036,059
[45] Date of Patent: Mar. 14, 2000

[54] LOW PROFILE AND LOW FORCE ACTUATION DISPENSING PUMP

[75] Inventor: Owen F. VanBrocklin, Bristol, Conn.

[73] Assignee: Risdon/AMS USA, Inc., Naugatuck, Conn.

[21] Appl. No.: 09/098,475

[22] Filed: Jun. 16, 1998

[51] Int. Cl.[7] ............................ G01F 11/28; B65D 88/54; B67D 5/40
[52] U.S. Cl. ........................ 222/321.9; 222/341; 222/385
[58] Field of Search .............................. 222/321.1, 321.7, 222/321.9, 340, 341, 385

[56] References Cited

U.S. PATENT DOCUMENTS

| | | |
|---|---|---|
| 3,627,206 | 12/1971 | Boris . |
| 3,774,849 | 11/1973 | Boris . |
| 3,796,375 | 3/1974 | Boris . |
| 4,017,031 | 4/1977 | Kishi et al. . |
| 4,082,222 | 4/1978 | Boris ...................................... 222/321 |
| 4,174,052 | 11/1979 | Capra et al. .............................. 222/207 |
| 4,228,931 | 10/1980 | Ruscitti et al. . |
| 4,272,228 | 6/1981 | Kutik et al. .............................. 222/383 |
| 5,147,073 | 9/1992 | Cater ....................................... 222/321 |

*Primary Examiner*—Joseph A. Kaufman
*Assistant Examiner*—Keats Quinalty
*Attorney, Agent, or Firm*—St. Onge Steward Johnston & Reens LLC

[57] ABSTRACT

A smooth actuating, non-throttling dispensing pump with a low force to actuate is provided. The pump will dispense a fluid at a pressure and flow velocity sufficient to allow the fluid to exit through the actuator in a fine particle spray. This action occurs when the actuator, depressed by the finger, moves a displacement piston downward pressurizing the fluid in the fluid chamber. When a predetermined pressure is reached, seals between the piston and stem open permitting the pressurized fluid to exit the fluid chamber through the actuator. The relationship of the frictional and spring forces plus the pressure acting on the piston and stem determines when and how the fluid is dispensed.

13 Claims, 10 Drawing Sheets

LOW PROFILE AND LOW FORCE ACTUATION DISPENSING PUMP

FIELD OF THE INVENTION

The present invention relates to a liquid dispensing pump, and more particularly to a non-throttling liquid dispensing pump having a low profile and a low force to actuate for dispensing measured doses of a liquid, such as perfume.

BACKGROUND OF THE INVENTION

Dispensing pumps for delivering measured quantities of a liquid are well known. Such pumps have long been used for a myriad of applications as an effective and efficient means of delivering liquids such as perfumes, medicines, air fresheners, and many other liquids. However, although the prior art is highly developed, certain deficiencies in this general area exist.

U.S. Pat. No. 4,082,222 to Boris, U.S. Pat. No. 4,941,595 to Montaner et al. and U.S. Pat. No. 5,156,304 to Battegazzore disclose spray pumps for delivering liquids. Each of the prior art pumps has a hollow body with a piston slidably disposed therein. The body and piston define a chamber containing the liquid to be dispensed. A rod fits slidably inside the piston and is forced into contact therewith by a spring. During use, force is applied to the rod causing it to move downward. When a certain pressure is reached in the chamber, the spring is compressed to open a channel between the rod and the piston so that the liquid can flow therethrough and be dispensed. A disadvantage of these prior art designs is that the pressure required to open the channel so that the liquid may be dispensed is a function of only the force applied by the operator and the spring forces. As such, the pumps do not have a smooth feel during pumping by the operator. Moreover, delivery of the liquid may not occur in a uniform fine mist because when the pump is actuated slowly, small amounts may leak out with a pressure insufficient to create such a mist. Another disadvantage of these prior art designs is that a high actuation force is required to dispense the liquid.

U.S. Pat. No. 4,960,230 to Marelli and U.S. Pat. No. 5,482,188 to Lina disclose fluid dispensing pumps similar to those discussed above. A disadvantage of these prior art designs is that the piston is caused to move upwards during pump actuation. This upward movement of the piston is not consistent with a pump having a smooth feel during actuation. A further disadvantage of the device disclosed in the Marelli patent is that no mechanical releasing mechanism is provided to keep the fluid delivery channel fully sealed until the desired critical pressure is reached. This deficiency may lead to small amounts of the liquid to be dispensed leaking out of the actuator prematurely with a pressure insufficient to create the desired fine uniform mist.

What is desired, therefore, is a non-throttling dispensing pump for delivering measured quantities of a liquid which delivers the liquid in a uniform fine mist, which is low in profile, which has a low force to actuate, and which has a smooth feel during actuation.

SUMMARY OF THE INVENTION

Accordingly, it is an object of the present invention to provide a dispensing pump which delivers a measured quantity of a liquid.

Another object of the present invention is to provide a dispensing pump having the above characteristics and which delivers the liquid in a uniform fine mist.

A further object of the present invention is to provide a dispensing pump having the above characteristics and which is low in profile.

Still another object of the present invention is to provide a dispensing pump having the above characteristics and which has a low force to actuate.

Yet a further object of the present invention is to provide a dispensing pump having the above characteristics and which has a smooth feel during actuation.

These and other objects of the present invention are achieved by provision of a dispensing pump having a hollow cylindrical body with openings at the top and bottom thereof. A check valve, preferably a ball check valve, is inserted in the body at the bottom opening thereof for allowing liquid to enter the body, but preventing liquid in the body from exiting through the bottom opening. A piston is disposed within the body and is adapted to slide axially in sealing contact within the body. The seal between the piston and the body is preferably a two-point seal, which provides improved sealing over traditional one point seals along with a low frictional resistance and a smooth feeling action.

The piston has a hole extending axially therethrough and has an annular lip extending therefrom proximate to the hole at the bottom of the piston. The annular lip has an outer contacting surface and an inner contacting surface. A stem is disposed within the piston and is adapted to slide axially in sealing contact with the piston. The stem has a circumferentially extending flange with an annular recess therein for receiving the annular lip of the piston. The recess has an interior contacting surface which forms an interior seal with the inner contacting surface of the annular lip of the piston and an exterior contacting surface which forms an exterior seal with the outer contacting surface of the annular lip of the piston when the dispensing pump is in a rest position. When the annular lip engages the recess, a detent is formed on the inner contacting surface of the annular lip which engages the interior contacting surface of the recess. The interior contacting surface of the stem includes a protrusion, with the diameter of the interior contacting surface tapering from the larger diameter protrusion to a smaller diameter at the bottom of the recess. The stem also has a channel passing from a hole through a wall thereof to the top end of the stem. The body, check valve, piston and stem define a substantially airtight fluid chamber when the pump is in a rest position.

A retainer, which includes an orifice, is attached to the stem such that when the seals between the annular lip of the piston and the annular recess of the stem are broken, the fluid chamber is in communication with the atmosphere through the channel of the stem and the orifice of the retainer. A piston spring is disposed between the piston and the retainer for urging the annular lip of the piston to engage the annular recess of the stem. A main spring is disposed between the bottom of the body and the stem for urging the stem and the piston upwards to a rest position. A collar is attached to the body proximate to the top thereof for containing the piston, stem, piston spring and main spring within the body. The collar has a hole therein for allowing the top of the piston, the top end of the stem, and a portion of the retainer to protrude therethrough. It should be noted that the spring forces of the main spring and the piston spring and the frictional forces between the piston and the body, between the piston and the stem, and between the stem and the collar are such that the piston is not allowed to move upwards during actuation of the pump.

Preferably, the piston includes an annular upper recess and the collar has an annular lower lip extending therefrom.

The upper recess of the piston and the lower lip of the collar are arranged such that when the piston is in a rest position the lower lip of the collar engages the upper recess of the piston forming a substantially airtight seal. The collar also preferably has at least one venting passage such that when the piston is forced from its rest position, an air chamber within the fluid container to which the pump is attached is in communication with the atmosphere. Also preferably, a mounting cup is attached to the collar for mounting the dispensing pump on a fluid container and a hollow dip tube extends from the bottom opening of the body.

The invention and its particular features and advantages will become more apparent from the following detailed description considered with reference to the accompanying drawings.

DETAILED DESCRIPTION OF THE INVENTION

Figure 1:
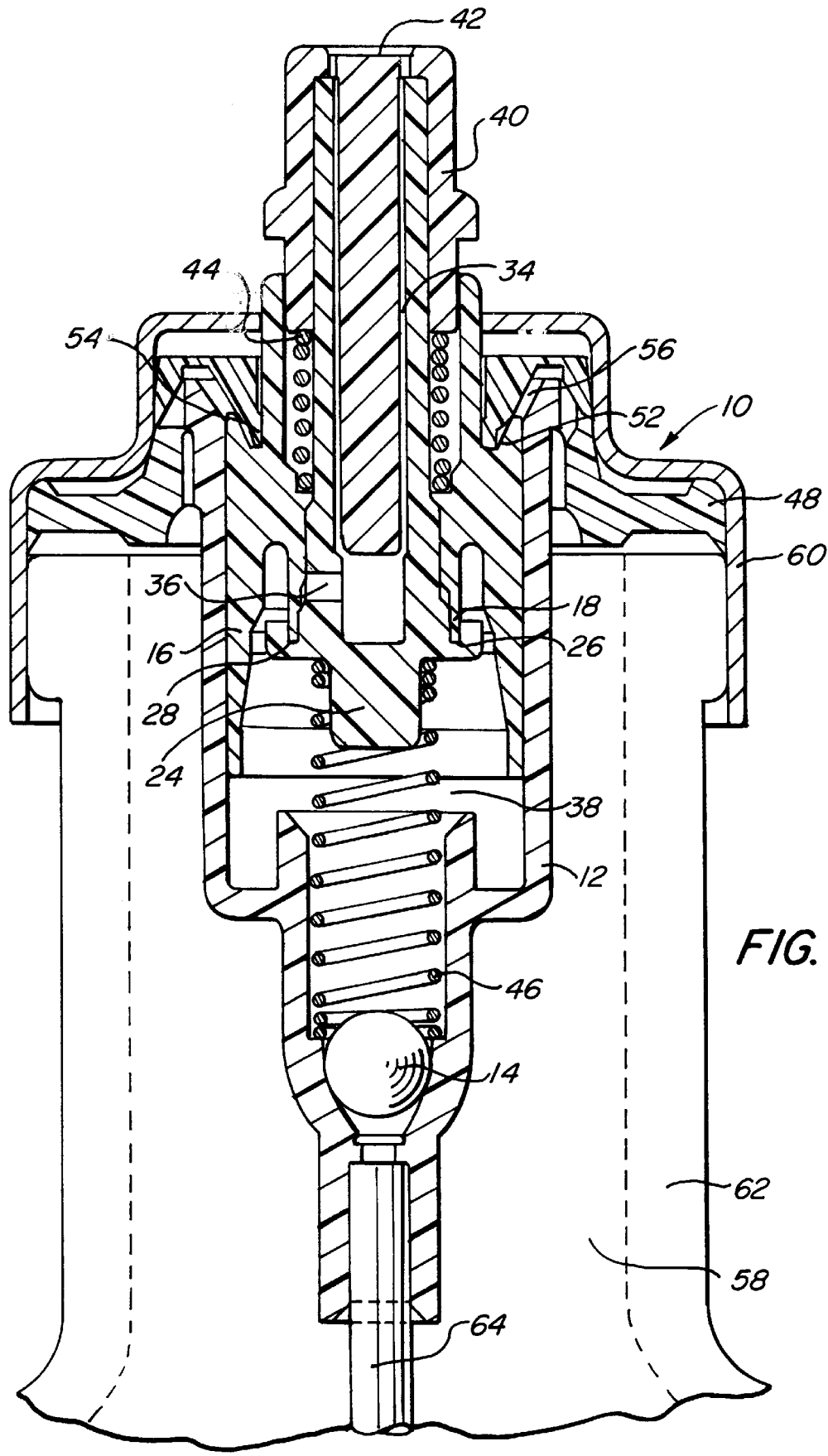
FIG. 1 is a partially cross-sectional view of a dispensing pump in accordance with the present invention.
Figure 2:
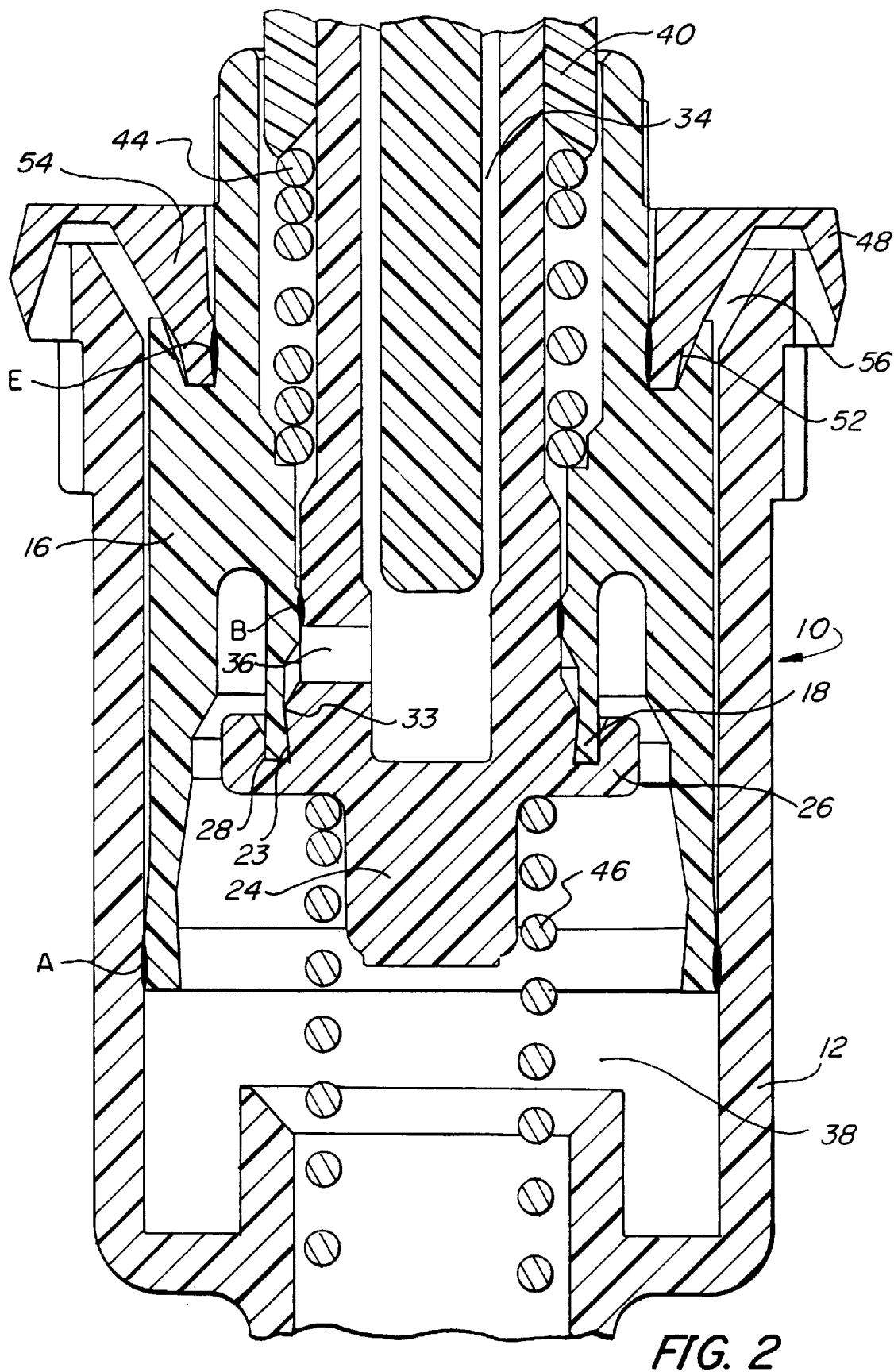
FIG. 2 is an enlarged, partially cross-sectional view of a portion of the dispensing pump of FIG. 1 shown in a rest position.

Referring first to FIGS. 1 and 2, a dispensing pump 10 in accordance with the present invention is shown. The dispensing pump 10 includes a hollow cylindrical body 12, which has openings at the top and bottom thereof. A check valve 14, preferably a ball check valve, is inserted in body 12 at the bottom opening thereof for allowing liquid to enter body 12, but preventing liquid in body 12 from exiting through the bottom opening.

Figure 13:
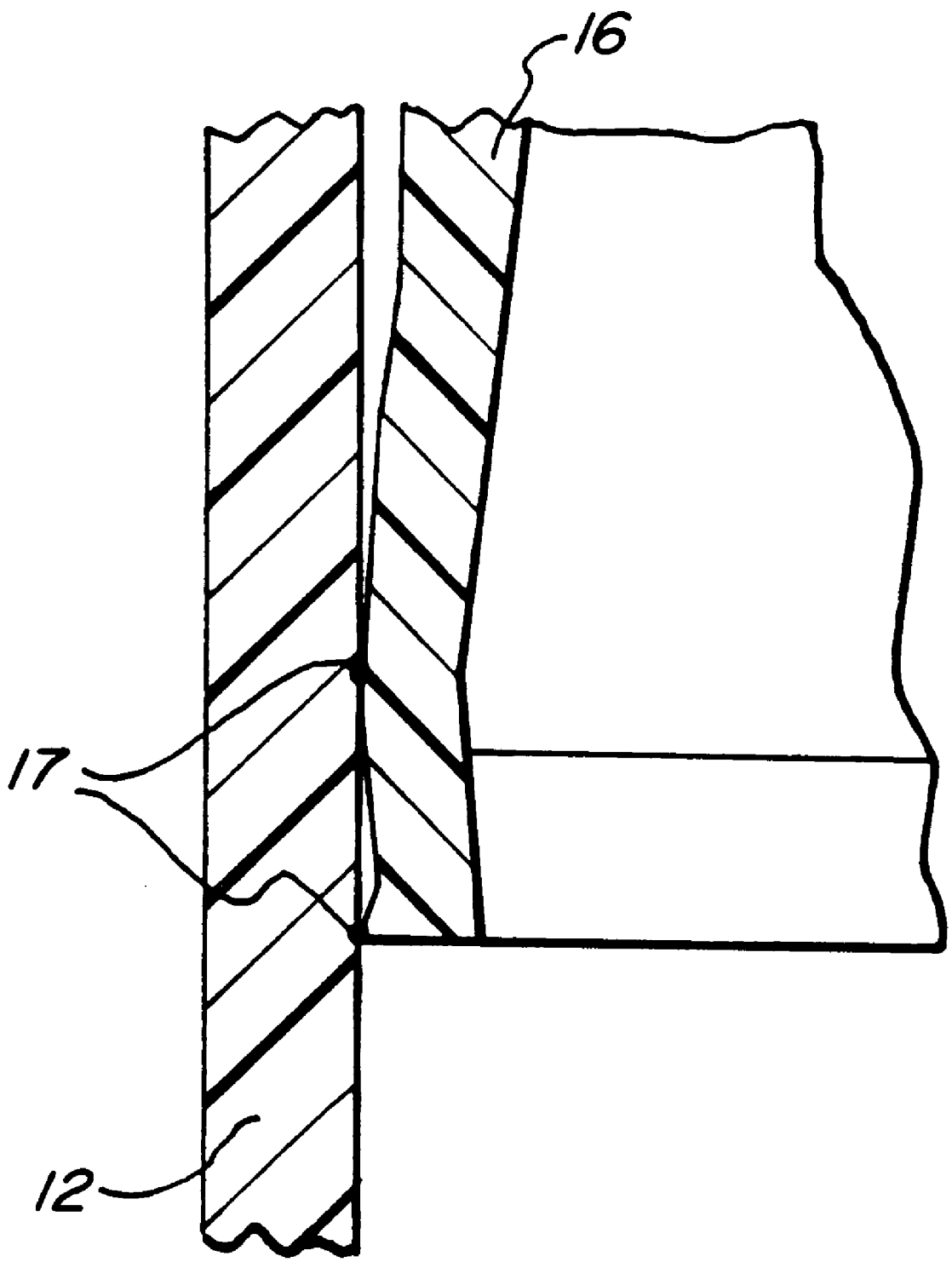

A piston 16 is disposed within body 12 and is adapted to slide axially in sealing contact within body 12. The seal between piston 16 and body 12 is shown in FIGS. 2–8 as reference character A. As illustrated in FIG. 13, seal A between piston 16 and body 12 is preferably a two-point seal, in that piston 16 is shaped such that two protruding annular surfaces 17 are in slidable sealing contact with body 12. This two-point seal provides improved sealing over traditional one point seals along with a low frictional resistance and a smooth feeling action.

Piston 16 has a hole extending axially therethrough and has an annular lip 18 extending therefrom proximate to the hole at the bottom of piston 16. Annular lip 18 has an outer contacting surface 20 and an inner contacting surface 22 (shown in FIGS. 9–12). A stem 24 is disposed within the hole of piston 16 and is adapted to slide axially in sealing contact with piston 16. The seal between stem 24 and piston 16 is highlighted in FIGS. 2–8 as reference character B. A thin cross section of piston 16 at the point of seal B provides flexibility allowing for a good seal with minimum friction. Seal B prevents leakage when the pump is actuated and liquid is flowing up through channel 34 of stem 24 under pressure. Stem 24 has a circumferentially extending flange 26 with an annular recess 28 therein for receiving annular lip 18 of piston 16. Referring now to FIGS. 9–12, annular recess 28 has an interior contacting surface 30 which forms an interior seal (highlighted in as reference character C) with inner contacting surface 22 of annular lip 18 and an exterior contacting surface 32 which forms an exterior seal (highlighted as reference character D) with outer contacting surface 20 of annular lip 18 when dispensing pump 10 is in a rest position. When annular lip 18 engages annular recess 28, a detent 23 is formed on inner contacting surface 22 of annular lip 18 which engages interior contacting surface 30 of recess 28. The diameter of interior contacting surface 30 of recess 28 tapers from a larger diameter at a protrusion 33 to a smaller diameter at the bottom of annular recess 28. Protrusion 33 is sized and shaped to engage detent 23 of annular lip 18 such that stem 24 resists axial movement relative to piston 16 until the desired pressure is reached during pumping, as described fully below. Stem 24 also has a channel 34 passing from a hole 36 through a wall thereof to the top end of stem 24. Body 12, check valve 14, piston 16 and stem 24 define a substantially airtight fluid chamber 38 when dispensing pump 10 is in a rest position.

A retainer 40, which includes an orifice 42, is attached to stem 24 such that when the seals between annular lip 18 of piston 16 and annular recess 28 of stem 24 are broken, fluid chamber 38 is in communication with the atmosphere through channel 34 of stem 24 and orifice 42 of retainer 40. A piston spring 44 is disposed between piston 16 and retainer 40 for urging annular lip 18 of piston 16 to engage annular recess 28 of stem 24. A main spring 46 is disposed between the bottom of body 12 and stem 24 for urging stem 24 and piston 16 upwards to a rest position. Preferably piston spring 44 and main spring 46 are coil springs.

A collar 48 is attached to body 12 proximate to the top thereof for containing piston 16, stem 24, piston spring 44 and main spring 46 within the body. Collar 48 has a hole therein for allowing the top of piston 16, the top end of stem 24, and a portion of retainer 40 to protrude therethrough. Collar 48 fits over piston 16 such that piston 16 slides axially in sealing contact with collar 48. The seal between piston 16 and collar 48 is highlighted in FIGS. 2–8 as reference character E. Preferably, piston 16 includes an annular upper recess 52 and collar 48 has an annular lower lip 54 extending therefrom. The upper recess 52 of piston 16 and lower lip 54 of collar 48 are arranged such that when piston 16 is in a rest position lower lip 54 of collar 48 engages upper recess 52 of piston 16 forming a substantially airtight seal. Collar 48 also preferably has at least one venting passage 56 such that when piston 16 is forced from its rest position, an air chamber 58 within a fluid container 62 to which dispensing pump 10 is attached is in communication with the atmosphere.

It should be noted that the spring forces of main spring 46 and piston spring 44 and the frictional forces between piston 16 and body 12, between piston 16 and stem 24, and between stem 24 and collar 48 are such that piston 16 is not allowed to move upwards during actuation of dispensing pump 10.

Preferably, a mounting cup 60 is attached to collar 48 for mounting the dispensing pump 10 on a fluid container 62. Mounting cup 60 may be of the crimping type, or of any other design to effectuate attachment of dispensing pump 10 to fluid container 62. Also preferably, a hollow dip tube 64 extends from the bottom opening of body 12 into fluid container 62 for facilitating removal of fluid from fluid container 62.

Operation of Dispensing Pump and Illustrative Example

Figure 9:
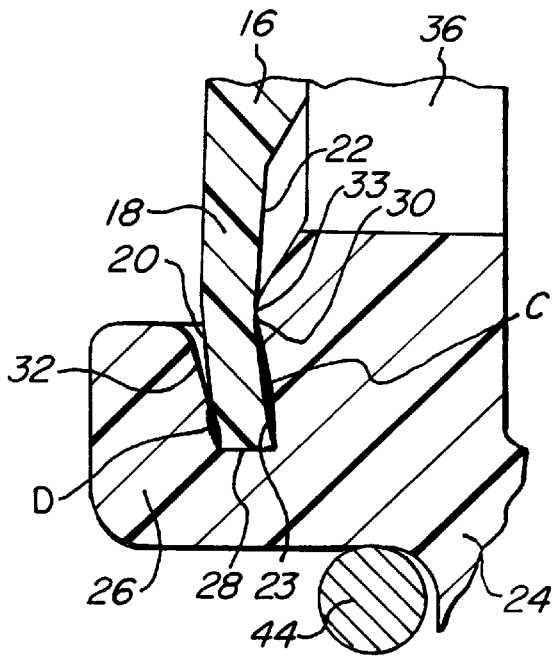
FIGS. 9–12 are enlarged, partially cross-sectional views of a portion of the dispensing pump of FIG. 1 shown at various stages of pump actuation; and, FIG. 13 is an enlarged, partially cross-sectional view of a portion of the dispensing pump of FIG. 1 showing the seal between the piston and the body.

Referring now to FIGS. 2–12, the following describes the functional sequence and forces involved during the actuation of dispensing pump 10 with reference to an illustrative example:

Step 1—In the rest position, shown in FIGS. 2 and 9, piston 16 is at the top if its stroke sealed against collar 48 and annular lip 18 of piston 16 is fully engaging recess 28 of stem 24. There are two sliding seals on the external surfaces of piston 16 that exert a frictional force during actuation: seal A between piston 16 and body 12 and seal E between piston 16 and collar 48. Since these two frictional forces are always additive, they will be referred to as frictional force ($f_{A+E}$). Inner contacting surface 22 of annular lip 18 is stretched over interior contacting surface 30 of annular recess 28 creating sliding seal C therebetween. During actuation seal C provides a frictional force ($f_C$). Outer contacting surface 20 of annular lip 18 forms a seal D with exterior contacting surface 32 of annular recess 28. Exterior contacting surface 32 of annular recess 28 is tapered inwardly, forcing outer contacting surface 20 into a wedge type seal. Since this is not a sliding seal, substantially no frictional forces are exerted by seal D.

Annular lip 18 of piston 16 is held in annular recess 28 of stem 24 by retainer 40 pressed onto the upper end of stem 24. Piston spring 44 is compressed between retainer 40 and piston 16, providing a spring force ($S_p$) that pulls stem 24 up into a sealed position with piston 16. Stem 24 forms sliding seal B with piston 16 having a frictional force ($f_B$). Main spring 46, which is compressed between the bottom of body 12 and the bottom of stem 24, provides the force ($S_m$) that returns piston 16 and stem 24 to the rest position and also adds to the force ($S_p$) forming and holding stem 24 in the sealed position with piston 16. Both springs have a normal force of ($S_{p0}$) and ($S_{m0}$).

Figure 3:
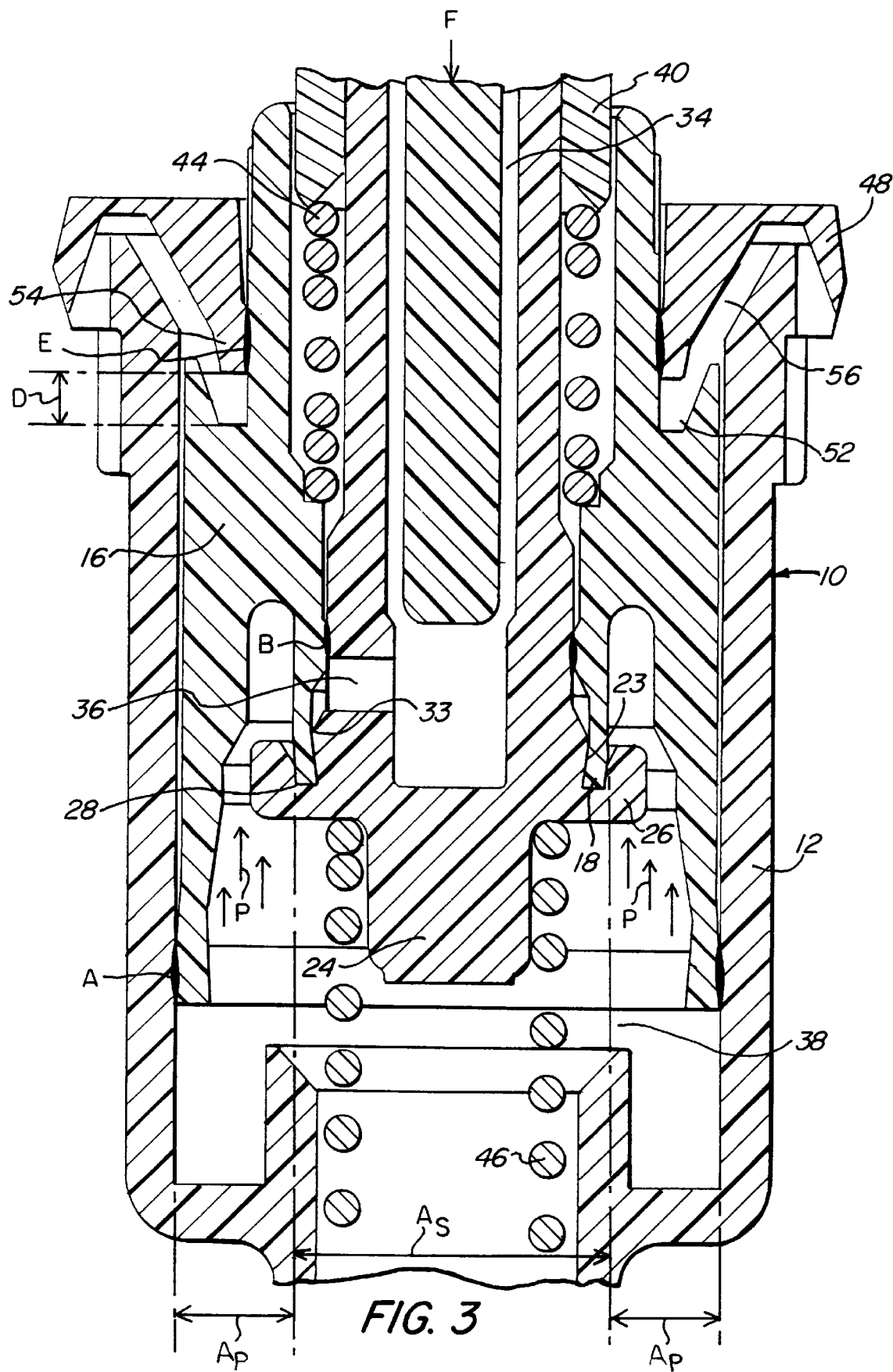
FIGS. 3–8 are enlarged, partially cross-sectional views of a portion of the dispensing pump of FIG. 1 shown at various stages of pump actuation.

Step 2—Referring now to FIGS. 3 and 9, an actuation force F (designated in FIGS. 3–8 by arrow F) has been applied to piston 16 which causes piston 16, stem 24, retainer 40 and piston spring 44 to move down distance G, which is approximately 0.025 inches, pressurizing the liquid in fluid chamber 38. Since main spring 46 has been compressed, $S_{m0}$ increases to $S_{m1}$. At this point stem 24 has not moved relative to piston 16 and the forces pushing piston 16 down are $S_{p0}$, $f_C$ and $f_B$. At the same time friction force $f_{A+E}$ and the pressure P (designated in FIGS. 3–8 by arrows P) acting upward on the piston area $A_p$, are resisting the downward movement of piston 16.
Therefore:

$$PA_p + f_{A+E} = f_C + f_B + S_{p0}$$

thus $$P = (f_C + f_B + S_{p0} - f_{A+E})/A_p$$

Then the downward actuation force F, in Step 2, is equal to the resisting force of the pressure P acting on the piston area $A_p$ plus the friction $f_{A+E}$ and the main spring force $S_{m1}$.

$$F = PA_p + f_{A+E} + S_{m1}$$

For example:
if
  $S_{p0}$=0.72 lbs.
  $f_{A+E}$=0.50 lbs.
  $f_C$=0.75 lbs.
  $f_B$=0.65 lbs.
  $A_p$=0.0339 sq. in.
  $S_{m1}$=1.078 lbs.
then
  P=47.79 psi
and
  F=4.02 lbs.

Figure 4:
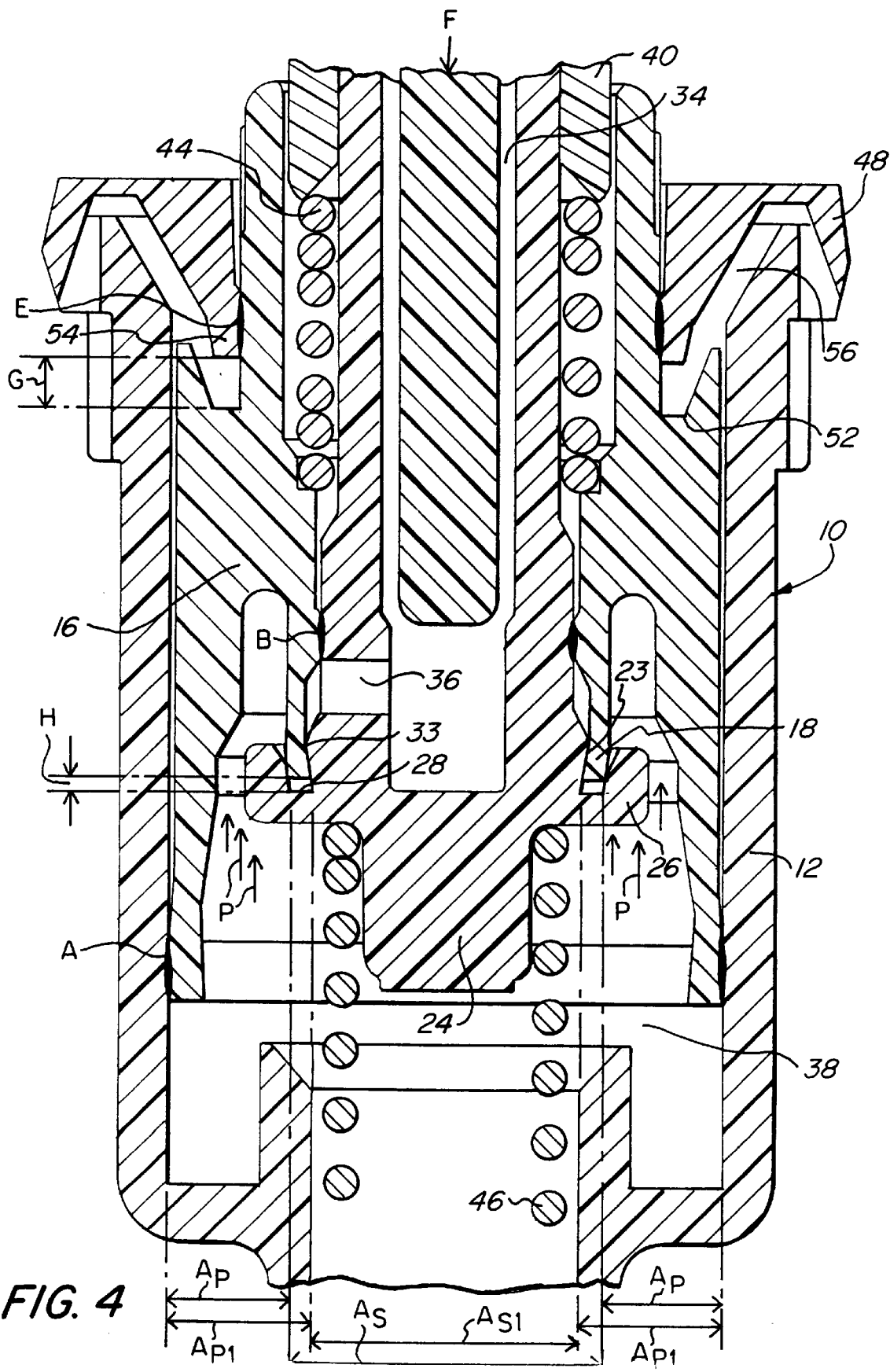
Figure 10:
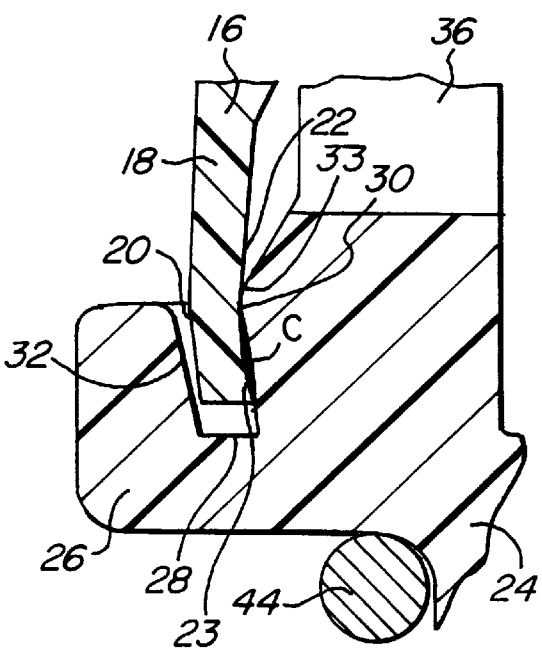

Step 3—Referring now to FIGS. 4 and 10, the continued downward actuation force F moves stem 24 relative to piston 16. This movement breaks exterior seal D between exterior contacting surface 32 of annular recess 28 and outer contacting surface 20 of annular lip 18, allowing the pressurized piston area $A_p$ to increase to $A_{p1}$, and the pressurized stem area $A_s$ to decrease to $A_{s1}$, while the total pressurized area A remains constant. Pressure P remains at substantially the level of Step #2, as does the distance G that piston 16 has traveled in body 12. Actuation force F increases slightly to $F_2$ when main spring 46 is compressed a further distance H, which is approximately 0.005 inches. Thus, $S_{m1}$ increases to $S_{m2}$. The relative movement between piston 16 and stem 24 also causes compression of piston spring 44, increasing its spring force from $S_{p0}$ to $S_{p1}$.

$$F = PA + f_{A+E} + S_{m2}$$

For example:
if
  P=47.79 psi.
  A=0.051 sq. in.
  $f_{A+E}$=0.50 lbs.
  $S_{m2}$=1.093 lbs.
then
  $F_2$=4.03 lbs.

Actuation force $F_2$ is now greater than the upward forces resisting further movement of stem 24.

$$F_2 > S_{p1} + f_C + f_B + PA_{s1} + S_{m2}$$

For example:
if
  P=47.79 psi
  $S_{p1}$=0.75 lbs.
  $f_C$=0.75 lbs.
  $f_B$=0.65 lbs.
  $A_{s1}$=0.0137 sq. in.
  $S_{m2}$=1.093 lbs.
then $$F_2 = 4.03 \text{ lbs.} > 3.89 = 0.75 + 0.75 + 0.65 + (47.79 \times 0.0137) + 1.093$$

Figure 5:
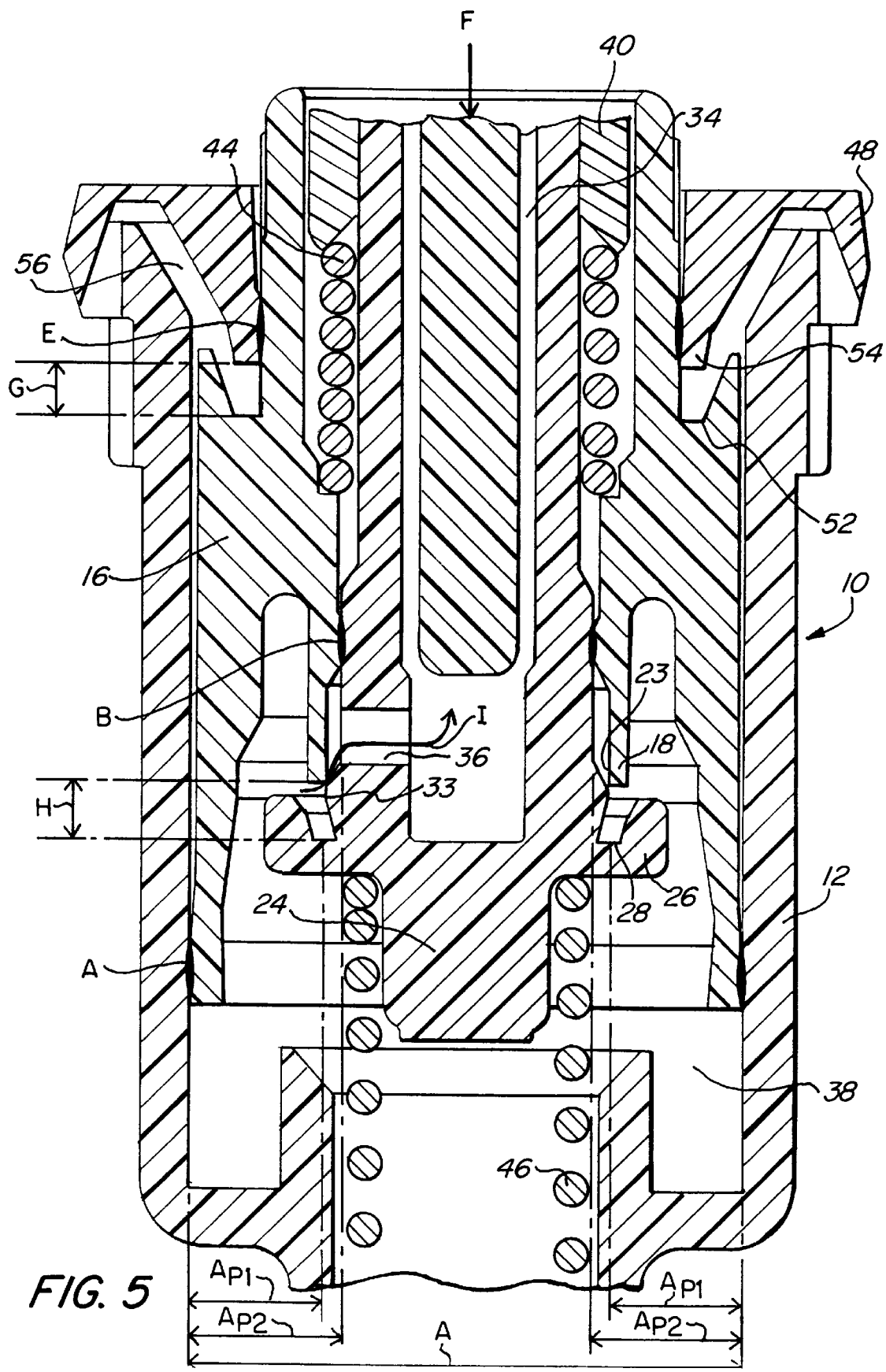
Figure 11:
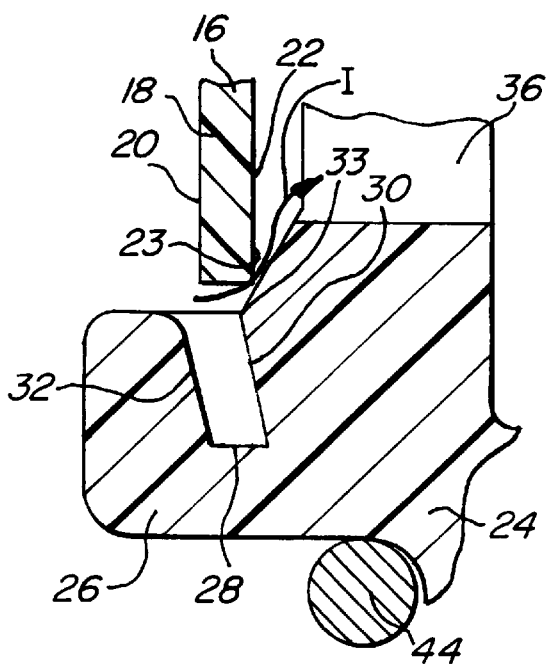

Step 4—Referring now to FIGS. 5 and 11, as a result of the force differential above, stem 24 moves further downward a distance of approximately 0.020 inches, making the total distance H of relative travel between stem 24 and piston 16 approximately 0.025 inches. Detent 23 of annular lip 18 looses contact with protrusion 33 of annular recess 28, breaking seal C and thereby causing frictional force $f_C$ to reduce to zero and the pressure area of the piston increases to $A_{p3}$. At this same time the liquid in fluid chamber 38 begins to flow (designated by arrows I) out through hole 36 in stem 24, thereby reducing pressure P. Because of the nature of the engagement between detent 23 and protrusion 33, the onset of fluid flow occurs rapidly, thus producing little or no leakage of fluid out through hole 36 before the desired pressure P is reached. At the initial point where seal C breaks, pressure P remains essentially the same as it was in Step 2. Actuation force $F_2$ has also increased slightly as the result of the further compression of main spring 46, the force of which has increased from $S_{m2}$ to $S_{m3}$. The further relative movement between piston 16 and stem 24 also causes further compression of piston spring 44, increasing its spring force from $S_{p1}$ to $S_{p2}$. The distance G that piston 16 has traveled in body 12 remains substantially the same.

$$F_3 = PA + f_{A+E} + S_{m3}$$

For Example:
if
 P=47.79 psi
 A=0.051 sq. in
 $f_{A+E}$0.50 lbs.
 $S_{m3}$=1.155 lbs.
then
 $F_3$=4.09 lbs.

The force differential between actuation force $F_3$ and the force resisting further movement of stem 24 is even greater.
For Example:
if
 $S_{p2}$=0.85 lbs.
 $f_B$=0.65 lbs.
 $A_{s1}$=0.0137 sq. in.
 $S_{m3}$=1.155 lbs.

$$F_3 = 4.09 \text{ lbs.} > 3.32 \text{ lbs.} = 0.85 + 0.65 + (47.79 \times 0.0137) + 1.155$$

Figure 6:
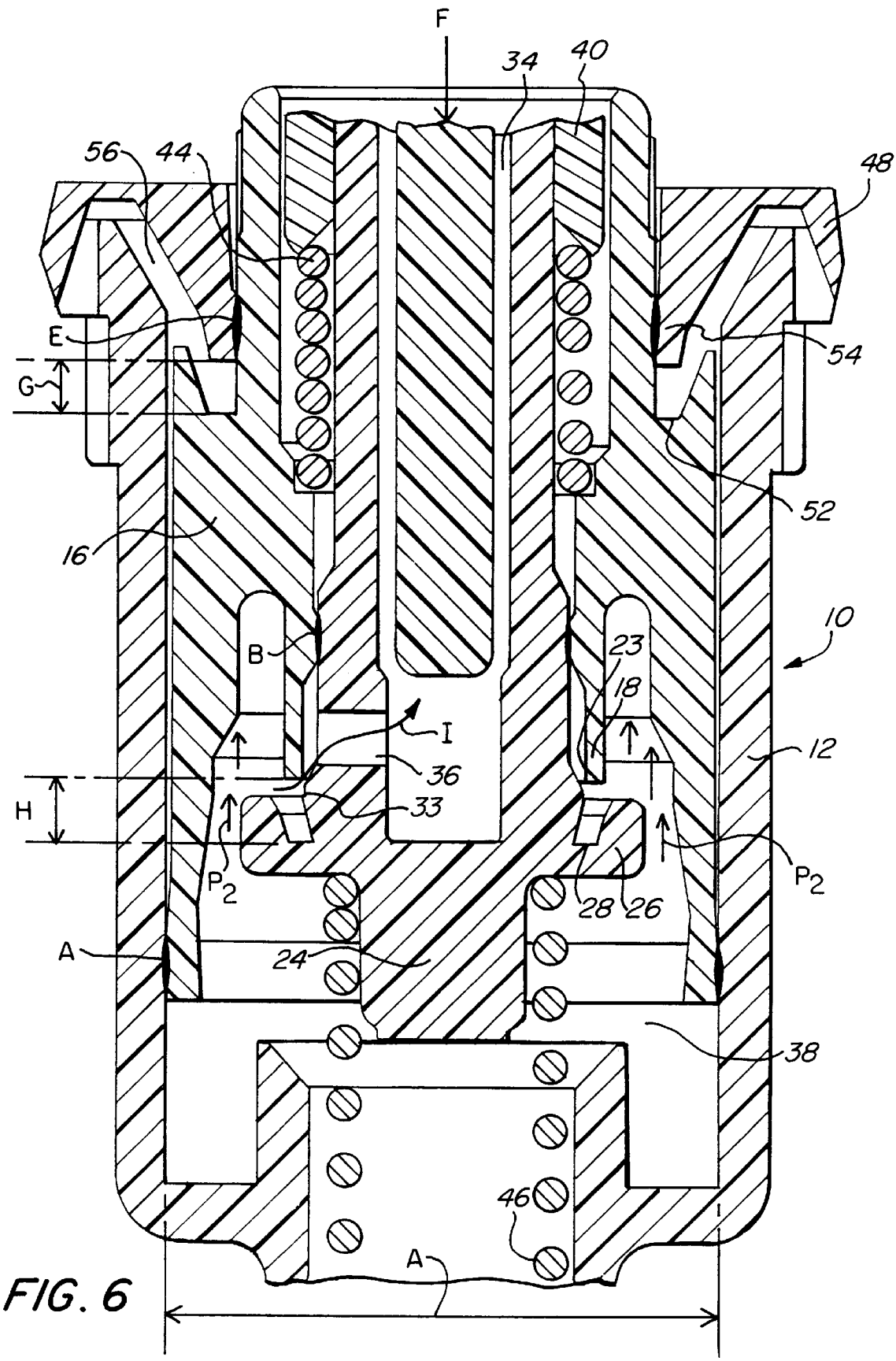
Figure 12:
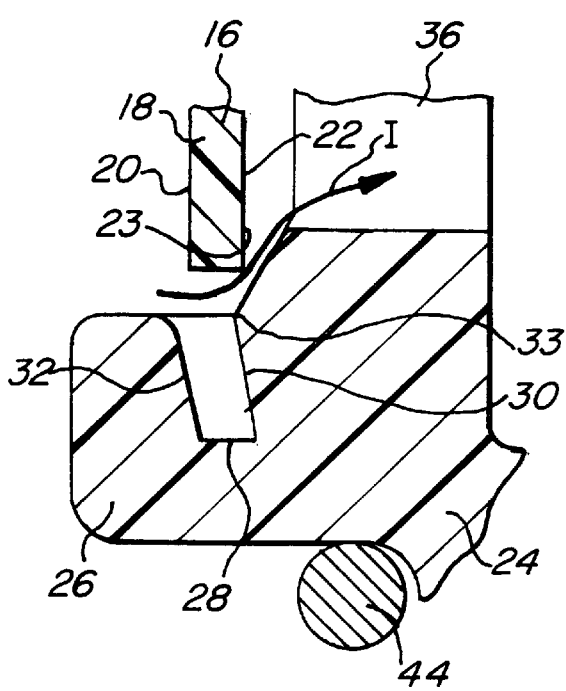

Step 5—Referring now to FIGS. 6 and 12, stem 24 moves further downward a distance of approximately 0.005 inches, making the total distance H of relative travel between stem 24 and piston 16 approximately 0.030 inches. The further compression of main spring 46 causes the spring force to increase from $S_{m3}$ to $S_{m4}$. The distance G that piston 16 has traveled in body 12 remains substantially the same. Flow (designated by arrows 1) of the liquid out through hole 36 in stem 24 is at a maximum. Assuming a 60% drop in pressure from P to $P_2$, due to flow, the actuation force $F_4$ would reduce to:

$$F_4 = P_2 A + f_{A+E} + S_{m4}$$

For Example:
if
 $P_2$=28.50 psi
 A=0.051 sq. in.
 $f_{A+E}$=0.50 lbs.
 $S_{m4}$=1.186 lbs.
then
 $F_4$3.14 lbs.

The non-throttling action is the result of the abrupt drop in pressure between Step #4 and Step #5 when the liquid begins to flow and when it is flowing at a maximum rate. Stem 24 moves only approximately 0.005 inches to fully open with a 20 psi pressure drop. Actuation force F decreases more than 20% and the reaction of the finger is not quick enough to prevent the continued down stroke.

Figure 7:
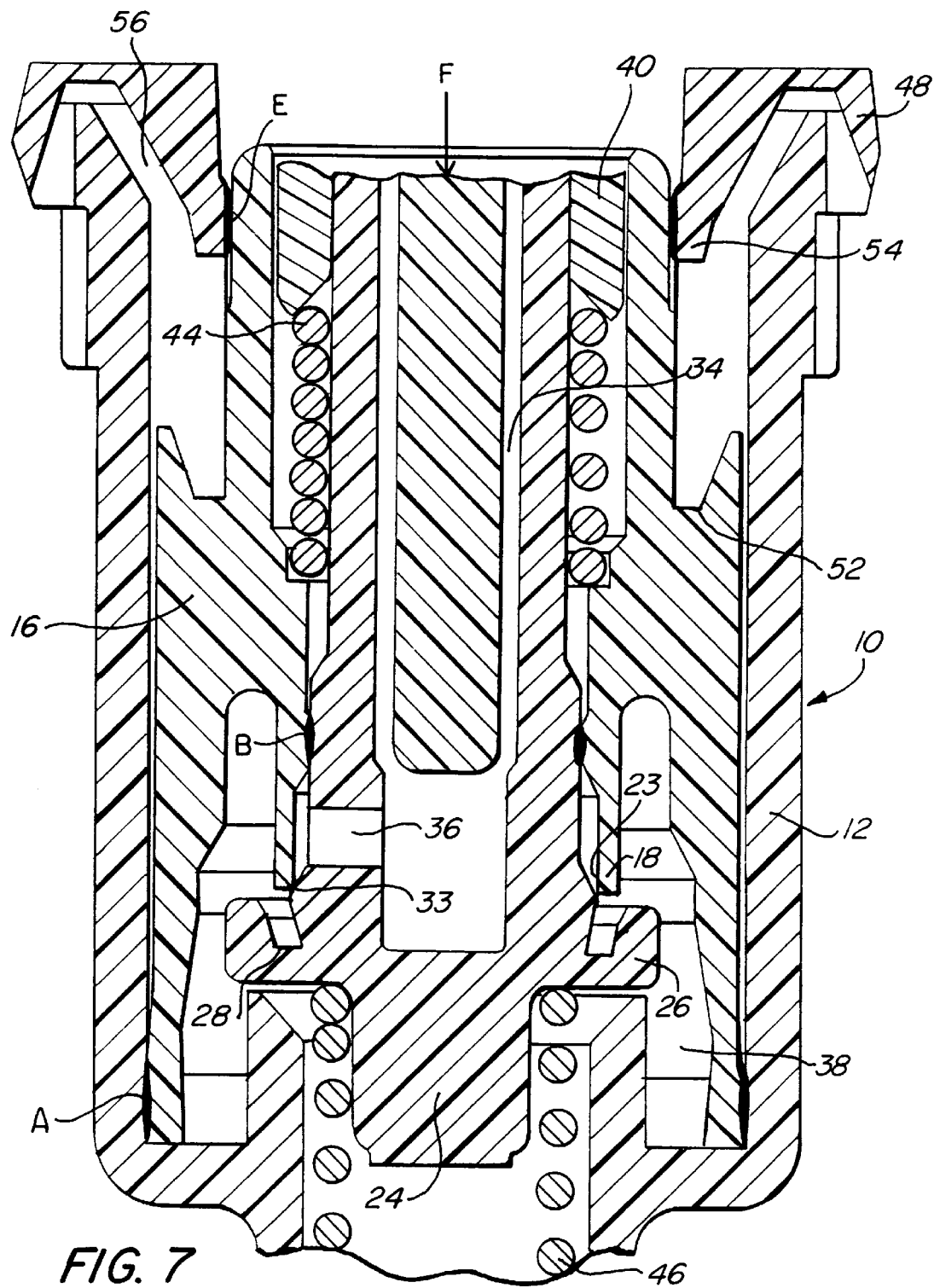
Figure 8:
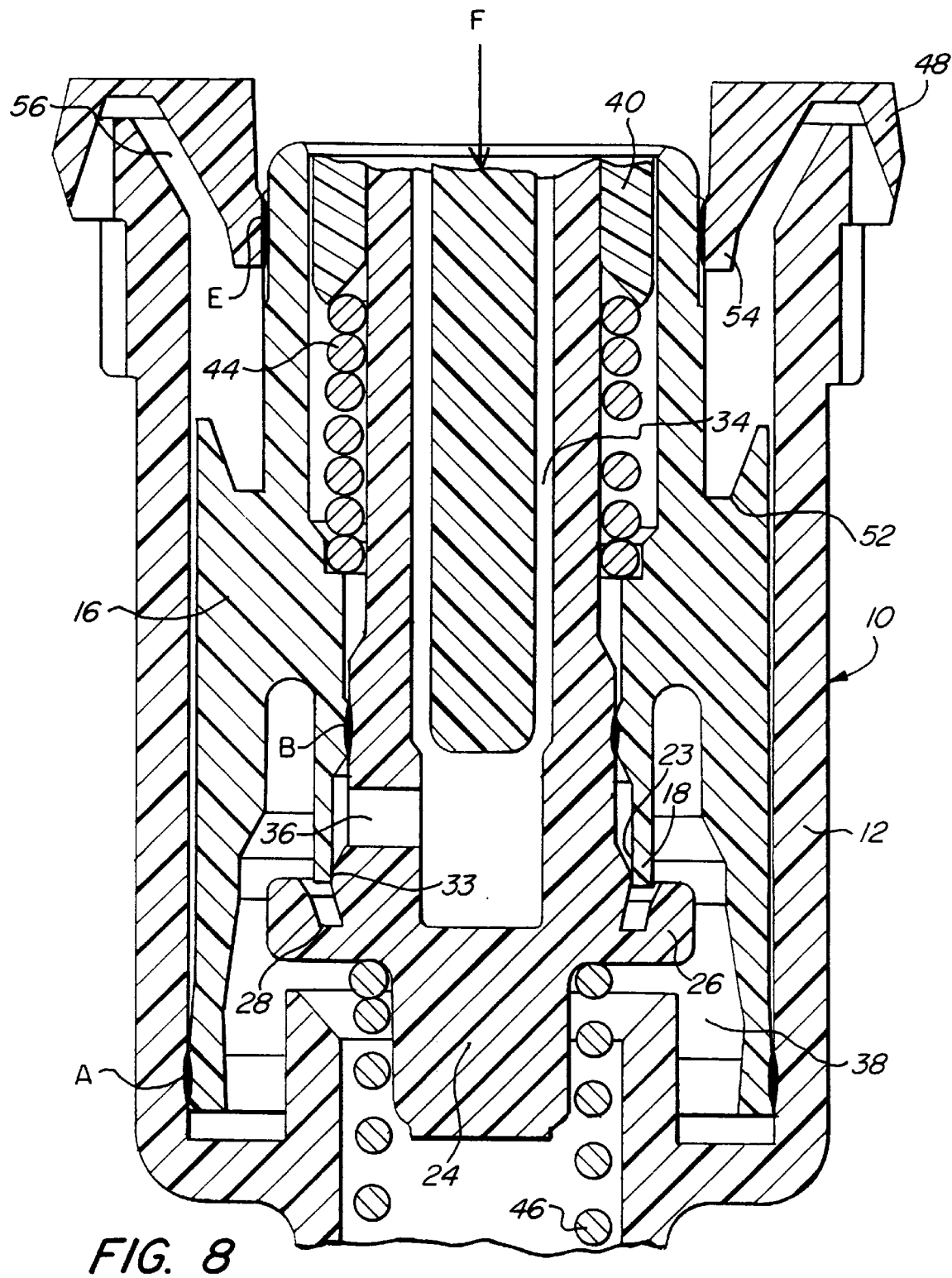

FIG. 7 shows piston 16 at the bottom of the stroke before stem 24 has moved into the sealed position. When piston 16 reaches the bottom it its stroke pressure P in fluid chamber 38 drops to zero. After actuation force F has been released a vacuum is created prior to the re-engaging of annular lip 18 of piston 16 and annular recess 28 of stem 24 by the upward movement of piston 16 and stem 24. This causes excess liquid to be pulled in from around orifice 42 of retainer 40 preventing a residue build-up that would eventually exit the pump and run down the actuator (not shown). FIG. 8 shows stem 24 returning to its sealed position with piston 16.

The low force to actuate is attained by balancing the effective areas of the piston, acted upon by the pressure, with minimum frictional and spring forces combining to provide the lowest pressure required to maintain a good spray pattern. The soft feel of actuation is the result of the smooth action of the sliding seals and by limiting the change in force to actuate at the moment the outlet valves opens. The soft feel of actuation is also due to the fact that the spring forces of main spring 46 and piston spring 44 and the frictional forces between piston 16 and body 12, between piston 16 and stem 24, and between stem 24 and collar 48 are such that piston 16 is not allowed to move upwards during actuation of dispensing pump 10. The uniform fine mist and absence of fluid leakage at the onset and termination of fluid flow is accomplished by the engagement between detent 23 and protrusion 33.

The present invention, therefore, provides a non-throttling dispensing pump for delivering measured quantities of a liquid which delivers the liquid in a uniform fine mist, which is low in profile, which has a low force to actuate, and which has a smooth feel during actuation.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A dispensing pump comprising:
 a hollow cylindrical body having openings at the top and bottom thereof;
 a check valve inserted in said body at the bottom thereof for allowing liquid to enter said body, but preventing liquid in said body from exiting through the bottom thereof;
 a piston disposed within said body, said piston being adapted to slide axially in sealing contact within said body, said piston having a hole extending axially therethrough from the top to the bottom of said piston, said piston also having an annular lip extending therefrom proximate to the hole at the bottom of said piston, the annular lip having an outer contacting surface and an inner contacting surface;
 a stem disposed within said piston, said stem being adapted to slide axially in sealing contact with said piston, said stem extending axially between a top end and a bottom end thereof, said stem having a circumferentially extending flange with an annular recess therein for receiving the annular lip of said piston, the recess having an interior contacting surface which forms an interior seal with the inner contacting surface of the annular lip of said piston and having an exterior contacting surface which forms an exterior seal with the outer contacting surface of the annular lip of said piston when the dispensing pump is in a rest position, a detent being formed on the inner contacting surface of the annular lip when the annular lip and the annular recess are engaged, the interior contacting surface including a protrusion sized and shaped to engage the detent of the annular lip of said piston such that said stem resists axial movement relative to said piston, said body, said check valve, said piston and said stem defining a substantially airtight fluid chamber when the pump is in a rest position, said stem also having a channel passing from a hole through a wall thereof to the top end of said stem;

a retainer attached to said stem, said retainer having an orifice and being attached to said stem such that when the seals between the annular lip of said piston and the annular recess of said stem are broken, the fluid chamber is in communication with the atmosphere through the channel of said stem and the orifice of said retainer;

a piston spring disposed between said piston and said retainer for urging the annular lip of said piston to engage the annular recess of said stem;

a main spring disposed between the bottom of said body and said stem for urging said stem and said piston upwards to a rest position;

a collar attached to said body proximate to the top thereof for containing said piston, said stem, said piston spring and said main spring within said body, said collar having a hole therein for allowing the top of said piston, the top end of said stem, and a portion of said retainer to protrude therethrough; and, wherein said piston is inhibited from moving upward within said body during actuation of the pump.

2. The dispensing pump of claim 1 wherein said piston has an annular upper recess and said collar has an annular lower lip extending therefrom, the upper recess of said piston and the lower lip of said collar being arranged such that when said piston is in a rest position the lower lip of said collar engages the upper recess of said piston forming a substantially airtight seal.

3. The dispensing pump of claim 2 wherein said collar has at least one venting passage such that when said piston is forced from its rest position, an air chamber within a fluid container to which the dispensing pump is attached is in communication with the atmosphere.

4. The dispensing pump of claim 1 wherein the sealing contact between said piston and said body is accomplished by a two-point seal.

5. The dispensing pump of claim 1 further comprising a mounting cup attached to said collar for mounting the dispensing pump on a fluid container.

6. The dispensing pump of claim 1 further comprising a hollow dip tube extending from the bottom opening of said body.

7. The dispensing pump of claim 1 wherein said check valve comprises a ball check valve.

8. A dispensing pump comprising:
a hollow cylindrical body having openings at the top and bottom thereof;
a check valve inserted in said body at the bottom thereof for allowing liquid to enter said body, but preventing liquid in said body from exiting through the bottom thereof;
a piston disposed within said body, said piston being adapted to slide axially in sealing contact within said body, said piston having a hole extending axially therethrough from the top to the bottom of said piston and an annular upper recess, said piston also having an annular lip extending therefrom proximate to the hole at the bottom of said piston, the annular lip having an outer contacting surface and an inner contacting surface;
a stem disposed within said piston, said stem being adapted to slide axially in sealing contact with said piston, said stem extending axially between a top end and a bottom end thereof, said stem having a circumferentially extending flange with an annular recess therein for receiving the annular lip of said piston, the recess having an interior contacting surface which forms an interior seal with the inner contacting surface of the annular lip of said piston and having an exterior contacting surface which forms an exterior seal with the outer contacting surface of the annular lip of said piston when the dispensing pump is in a rest position, a detent being formed on the inner contacting surface of the annular lip when the annular lip and the annular recess are engaged, the interior contacting surface including a protrusion sized and shaped to engage the detent of the annular lip of said piston such that said stem resists axial movement relative to said piston, said body, said check valve, said piston and said stem defining a substantially airtight fluid chamber when the pump is in a rest position, said stem also having a channel passing from a hole through a wall thereof to the top end of said stem;

a retainer attached to said stem, said retainer having an orifice and being attached to said stem such that when the seals between the annular lip of said piston and the annular recess of said stem are broken, the fluid chamber is in communication with the atmosphere through the channel of said stem and the orifice of said retainer;

a piston spring disposed between said piston and said retainer for urging the annular lip of said piston to engage the annular recess of said stem;

a main spring disposed between the bottom of said body and said stem for urging said stem and said piston upwards to a rest position;

a collar attached to said body proximate to the top thereof for containing said piston, said stem, said piston spring and said main spring within said body, said collar having a hole therein for allowing the top of said piston, the top end of said stem, and a portion of said retainer to protrude therethrough, said collar also having an annular lower lip extending therefrom, the lower lip of said collar being arranged such that when said piston is in a rest position the lower lip of said collar engages the upper recess of said piston forming a substantially airtight seal, said collar further having at least one venting passage such that when said piston is forced from its rest position, an air chamber within a fluid container to which the dispensing pump is attached is in communication with the atmosphere; and, wherein said piston is inhibited from moving upward within said body during actuation of the pump.

9. The dispensing pump of claim 8 wherein the sealing contact between said piston and said body is accomplished by a two-point seal.

10. The dispensing pump of claim 8 further comprising a mounting cup attached to said collar for mounting the dispensing pump on a fluid container.

11. The dispensing pump of claim 8 further comprising a hollow dip tube extending from the bottom opening of said body.

12. The dispensing pump of claim 8 wherein said check valve comprises a ball check valve.

13. A dispensing pump comprising:
a hollow cylindrical body having openings at the top and bottom thereof;
a ball check valve inserted in said body at the bottom thereof for allowing liquid to enter said body, but preventing liquid in said body from exiting through the bottom thereof;

a hollow dip tube extending from the bottom opening of said body;

a piston disposed within said body, said piston being adapted to slide axially in sealing contact within said body, the sealing contact between said piston and said body being accomplished by a two-point seal, said piston having a hole extending axially therethrough from the top to the bottom of said piston and an annular upper recess, said piston also having an annular lip extending therefrom proximate to the hole at the bottom of said piston, the annular lip having an outer contacting surface and an inner contacting surface;

a stem disposed within said piston, said stem being adapted to slide axially in sealing contact with said piston, said stem extending axially between a top end and a bottom end thereof, said stem having a circumferentially extending flange with an annular recess therein for receiving the annular lip of said piston, the recess having an interior contacting surface which forms an interior seal with the inner contacting surface of the annular lip of said piston and having an exterior contacting surface which forms an exterior seal with the outer contacting surface of the annular lip of said piston when the dispensing pump is in a rest position, a detent being formed on the inner contacting surface of the annular lip when the annular lip and the annular recess are engaged, the interior contacting surface including a protrusion sized and shaped to engage the detent of the annular lip of said piston such that said stem resists axial movement relative to said piston, said body, said check valve, said piston and said stem defining a substantially airtight fluid chamber when the pump is in a rest position, said stem also having a channel passing from a hole through a wall thereof to the top end of said stem;

a retainer attached to said stem, said retainer having an orifice and being attached to said stem such that when the seals between the annular lip of said piston and the annular recess of said stem are broken, the fluid chamber is in communication with the atmosphere through the channel of said stem and the orifice of said retainer;

a piston spring disposed between said piston and said retainer for urging the annular lip of said piston to engage the annular recess of said stem;

a main spring disposed between the bottom of said body and said stem for urging said stem and said piston upwards to a rest position;

a collar attached to said body proximate to the top thereof for containing said piston, said stem, said piston spring and said main spring within said body, said collar having a hole therein for allowing the top of said piston, the top end of said stem, and a portion of said retainer to protrude therethrough, said collar also having an annular lower lip extending therefrom, the lower lip of said collar being arranged such that when said piston is in a rest position the lower lip of said collar engages the upper recess of said piston forming a substantially airtight seal, said collar further having at least one venting passage such that when said piston is forced from its rest position, an air chamber within a fluid container to which the dispensing pump is attached is in communication with the atmosphere;

a mounting cup attached to said collar for mounting the dispensing pump on a fluid container; and, wherein said piston is inhibited from moving upward within said body during actuation of the pump.

* * * * *